United States Patent Office 3,260,698
Patented July 12, 1966

3,260,698
CRYSTALLINE POLYVINYL ETHERS PREPARED WITH CHROMIC ANHYDRIDE CATALYSTS
Senji Nakano, Koichiro Iwasaki, and Hideo Fukutani, all of Setagaya-ku, Tokyo, Japan, assignors to Mitsubishi Chemical Industries Limited, Tokyo, Japan, a corporation of Japan
No Drawing. Filed Jan. 5, 1962, Ser. No. 164,596
Claims priority, application Japan, Jan. 20, 1961, 36/1,485
12 Claims. (Cl. 260—45.95)

This invention relates to a method of manufacturing polyvinyl ethers and more particularly to a method of manufacturing crystalline polyvinyl ethers.

An object of the present invention is to provide a method by which crystalline polyvinyl ethers are economically manufactured. Another object of the present invention is to provide a method of economically manufacturing polyvinyl ethers of high molecular weight which are not tacky, not fluid and easy to be fabricated or molded.

The aforementioned objects are accomplished according to the present invention by polymerizing vinyl ether in the presence of chromic anhydride and an antioxidant.

Various methods have been known by which vinyl ethers are polymerized in the presence of a catalyst, i.e., such so-called Friedel-Crafts catalyst as aluminium trichloride and boron trifluoride, or catalyst of such inorganic acid as sulfuric acid and phosphoric acid. Polyvinyl ethers obtained by these known methods are found to be amorphous and low molecular weight polymers showing a low reduced viscosity. They are usually tacky and of high fluidity and generally soluble in solvents. For example, amorphous polyvinyl methyl ether is completely soluble in cold water and methanol whilst amorphous polyvinyl isobutyl ether is completely soluble in methyl ethyl ketone and benzene. Owing to the features as such, these polymers cannot be employed for fabricating film, sheet, plate or other builder's materials.

There has been developed recently a method of manufacturing rubber-like crystalline polyvinyl ethers of high molecular weight by way of polymerizing vinyl ether employing boron trifluoride-etherate as catalyst at an extremely low temperature below —30° C., preferably below —70° C. In accordance with such a method, however, difficulties are encountered in the manufacture from a technical view point because of an extremely low temperature at which the polymerization must be performed.

To solve this problem the present invention provides a method by which highly crystalline polyvinyl ethers of high molecular weight having an extensive use for producing various builder's materials are economically manufactured.

The feature of the invention resides in the employment of chromic anhydride together with an antioxidant for polymerizing a vinyl ether.

The highly crystalline and high molecular weight polyvinyl ether in accordance with the invention is efficiently obtained by way of polymerizing a mono vinyl ether at such a temperature as 50 to 100° C. that is very convenient for performing the manufacture of the polymer on an industrial scale.

Details of the invention will be further explained in the following.

Various vinyl ether monomers having alkyl, aryl, aralkyl, and cycloalkyl-radical of 1 to 18 carbon atoms are used as starting material in the present invention. Among these are, for example, such alkyl vinyl ethers as methyl-, ethyl-, propyl-, n-butyl-, isobutyl-, secondary butyl-, tertiary butyl-, n-pentyl-, n-hexyl, n-octyl-, 2-ethyl-hexyl-, lauryl-, and stearyl-vinyl ether; such aralkyl vinyl ethers as benzy-vinyl ether; and such cycloalkyl vinyl ethers as cyclohexyl-vinyl ether.

In the polymerization performed according to the invention it is imperative to use chromic anhydride as catalyst, which has been preferably heated in dry air at a temperature from 100 to 150° C. for 1 to 5 hr. prior to the application to the method of the invention in order that chromic anhydride is activated to a higher degree. The amount to be employed is usually within a range from 0.1 to 5.0%, preferably 1.0 to 3.0% by weight of vinyl ether monomer.

It is also imperative according to the invention to employ at least one kind of antioxidant together with the aforementioned chromic anhydride (catalyst) in the polymerization of mono vinyl ether for the reasons that chromic anhydride itself exerts a remarkable catalytic activity in the polymerization reaction of vinyl ether while adversely affecting, on account of the strong oxidising character, the starting monomer or the resultant polymer in the course of the reaction. However, such unfavorable influence will never be exercised on the polymerization reaction provided an antioxidant coexists with chromic anhydride. In addition, a higher molecular weight polyvinyl ether will be obtained as will be described by reference to the examples in the following. The so-called antioxidants are applicable to the method according to the invention which have been usually employed for the purpose of averting the oxidation of organic chemicals and polymers. The preferable antioxidants are substituted phenols having at least a substituted radical such as alkyl-, aryl-, aralkyl-, and cycloalkyl-radical of 1 to 8 carbon atoms or hydroxy-radical. They are for example hydroquinone, mono- or di-tertiary-butyl-p-cresol, mono- or di-tertiary-butyl-phenol bis-(2-hydroxy-3-tertiary-butyl-5-methyl-phenyl) methane, bis-(2-hydroxy-3-α-methylcyclohexyl-5-methyl phenol) methane, 2-α-methylcyclohexyl-4.6-dimethylphenol, 2-tertiary-butyl-4.6-dimethyl phenol, 2- and 3-tertiary-butyl-4-methoxy phenol. Such arylamines as N-phenyl-α-naphthyl amine and β-naphthyl amine may also be used as antioxidants in the present method. The quantity of antioxidant to be used ranges from 0.1 to 3.0%, preferably from 0.5 to 2.0% by weight of the starting ether monomer.

The polymerization reaction according to the invention may be performed over a wide temperature range. The temperature for effecting the polymerization ought to be usually above 30° C. on the ground that at a temperature below 30° C. the polymerization proceeds considerably slower so that the practice on an industrial scale is rendered materially difficult. A temperature from 30 to 200° C., preferably from 50 to 100° C. is fit for the industrial embodiment of the invention. A great feature of the invention resides in the fact that crystalline polyvinyl ether of high molecular weight is obtained at such a temperature as mentioned above, the fact being never anticipated by the known prior art.

Although the polymerization reaction according to the invention is carried out usually under atmospheric pressure, it may be possible to employ a higher pressure, if required, which is 20 atm. or less.

In the present method such inert diluents as petroleum ether, n-hexane, n-heptane, cyclohexane, octane, benzene, toluene, and xylene are preferred for rendering the operation easier. In this connection it is to be noted that the use of such a diluent is not imperative for performing the polymerization.

Polyvinyl ethers thus polymerized are recovered by adding the reaction mixture to a non-solvent for polyvinyl ethers such as hot water for polyvinyl methyl ether, or methanol for polyvinyl higher alkyl ether and then separating the precipitated polyvinyl ether from the mixture. Polyvinyl ethers thus obtained are solids, which are not tacky and low in fluidity. According to the present method, elastic or hard resinous polyvinyl ethers are obtained, in general, depending on the kind of vinyl ethers to be polymerized.

The polyvinyl ethers obtained by the invention contain some crystalline portion depending upon the reaction conditions. These results are confirmed by the usual method for measuring crystalline portion, which employs X-ray diffraction pattern, or infrared spectrograms or selective solvent. For separating the crystalline portion of polyvinyl ether obtained by the invention, if desired, it is preferable to use the selective solvent which dissolves only amorphous portion of the polyvinyl ethers. For example, a selective solvent for amorphous polyvinyl methyl ether is methanol or cold water, and that for amorphous polyvinyl isobutyl ether is methyl ethyl ketone.

Polyvinyl ethers obtained according to the invention are high molecular weight polymers appreciated as such in view of the highly reduced viscosity. As will be shown in the embodiments the reduced viscosity of the polymer according to the invention is obviously higher than that of the polymer obtained by known methods.

By virtue of these features the polyvinyl ethers according to the invention are useful in fabricating various materials such as coating material, film, sheet, plate, board, filament and other shaped materials.

This invention will now be set forth further with reference to specific embodiments only for the purpose of illustration and not for the purpose of limiting the same.

EXAMPLE 1

50 cc. of refined isobutyl vinyl ether and 400 mg. of di-tertiarybutyl cresol (antioxidant) are charged in a closed vessel equipped with a stirrer and a thermometer to which closed vessel dry nitrogen gas is introduced. 400 mg. of chromic anhydride in particles passing a screen of 100 mesh which have been activated by being held in a preheated dry air flow for 3 hr. at 110° C. are added to the abovementioned vessel. Polymerization reaction is carried out at the boiling point, i.e. about 83° C. while stirring for 2 hrs. Upon completion of the reaction and cooling the reaction mixture is poured by degrees into a large quantity of methanol to allow the polymer to precipitate in light yellow flakes. The flakes are taken out by filtering followed by washing by use of a mixture consisting of water and methanol and drying at 60° C. under a reduced pressure to obtain 20.6 g. of polyvinyl isobutyl ether, which is light yellow and not tacky. The reduced viscosity measured for 0.5 g. of the polymer in 100 ml. of benzene solution at 25° C. was 5.58. Further 32% of this polymer was not soluble in methyl ethyl ketone, and this insoluble crystalline portion was found to have the melting point of 140 to 142° C. and gives a sharp X-ray diffraction pattern. The polymer obtained in this example is not tacky and capable of forming a film.

*Example a in comparison with Example 1*

The polymerization of isobutyl vinyl ether was performed under the same conditions as in Example 1 excepting the use of 0.2 cc. of dioxane solution containing 0.4% by volume of boron trifluoride etherate in place of 400 mg. of chromic anhydride.

*Example b in comparison with Example 1*

Isobutyl vinyl ether was polymerized under the same conditions as in Example 1 except the omission of di-tertiarybutyl cresol.

Table 1 shows the respective nature of polyvinyl isobutyl ether as obtained in Examples a, b and Example 1.

TABLE 1

| | Polyvinyl Isobutyl Ether | | Remarks |
|---|---|---|---|
| | Cryst. Portion | Reduced Viscosity | |
| Example 1 | 32 | 5.58 | Present invention. |
| Example a | 0 | 0.22 | Known catalyst used without antioxidant. |
| Example b | 20 | 1.04 | Chromic anhydride used without antioxidant. |

NOTE.—The reduced viscosity in Table 1 denotes that of 0.5 g. polymer/100 ml. benzene solution at 25° C.

EXAMPLE 2

50 cc. of refined isopropyl vinyl ether and 400 mg. of tertiarybutyl hydroquinone (antioxidant) are charged in the same reaction vessel as in Example 1 followed by an addition of 100 mg. of chromic anhydride, which has been activated in a flow of dry air at 110° C. for 3 hrs. and stirring at the boiling point, i.e. about 55 to 56° C. for 5 hrs. to effect polymerization. Upon completion of the reaction, the resultant mixture is treated similarly as in Example 1 to obtain 22.6 g. of polyvinyl isopropyl ether, which is not tacky. The reduced viscosity of thus obtained polymer containing 18% of methyl ethyl ketone-insoluble portion showed 4.558.

EXAMPLE 3

50 cc. of refined ethyl vinyl ether and 400 mg. of tertiarybutyl phenol (antioxidant) are charged in an autoclave equipped with a stirrer and a thermometer. After an addition of 150 mg. of chromic anhydride, which has been activated, to the autoclave, the same is tightly closed followed by heating at 80° C. while stirring to permit the reaction pressure to reach 5 kg./cm.$^2$ The reaction continues under these conditions for 2 hrs. followed by cooling to precipitate the reaction mixture, which is washed by methanol and dried at 50° C. under reduced pressure to obtain 16.9 g. of rubber-like polyvinyl ethyl ether. The reduced viscosity of this polymer showed 3.85 and the methyl ethyl ketone-insoluble portion of the polymer indicated 11%.

EXAMPLE 4

50 cc. of methyl vinyl ether and 400 mg. of di-tertiarybutyl cresol are charged in the same reaction vessel as in Example 3. After an addition of 300 mg. of preactivated chromic anhydride the reaction vessel is closed and heated at 80° C. while stirring to permit the reaction pressure to reach 11 kg./cm.$^2$. Under the conditions the reaction is carried out for 10 hrs. Upon completion of the reaction, the reaction vessel is allowed to cool and then the reaction mixture is discharged into water at 50° C. to recover white solid precipitate by way of filtration, which is dried at 40° C. in vacuo. Thus obtained are 16.9 g. of white soft rubber-like polyvinyl methyl ether. The reduced viscosity of this polymer showed 0.83 and the methanol-insoluble portion indicated 28%.

EXAMPLES 5 TO 8

Into the same reaction vessel as in Example 1 are filled 50 cc. of toluene (diluent), 25 cc. of isobutyl vinyl ether, 20 mg. of antioxidant as shown in Table 2 and subsequently 150 mg. of chromic anhydride to effect reaction at the boiling point while stirring for 2 hrs. Upon completion of the reaction, the reaction mixture is discharged into methanol to recover solid precipitate by way of filtering, which is then dried at 60° C. in vacuo. Thus obtained are non-tacky polyvinyl isobutyl vinyl ethers as shown in Table 2.

TABLE 2

| Ex. | Antioxidant | Polymer | | |
|---|---|---|---|---|
| | | Yield in g. | Reduced Viscosity | Crystalline Portion in Percent |
| Ex. 5 | Di-tertiarybutyl cresol | 17.4 | 2.15 | 29 |
| Ex. 6 | Hydroquinone | 15.8 | 1.54 | 27 |
| Ex. 7 | Tertiarybutyl hydroquinone | 14.3 | 1.74 | 27 |
| Ex. 8 | Tertiarybutyl phenyl | 17.1 | 2.01 | 31 |

What we claim:
1. A method of producing crystalline polyvinyl ethers which consists essentially in placing in a reaction vessel a vinyl ether of the formula—

$$CH_2=CH-OR$$

where R is a radical having 1 to 18 carbon atoms taken from the class consisting of alkyl, aryl, aralkyl and cycloalkyl radicals, introducing into said vessel finely divided chromic anhydride as a catalyst, and heating said mixture to a temperature above about 30° C. and up to about 200° C. for a sufficient time to polymerize said ether.

2. A method according to claim 1 characterized in that the amount of chromic anhydride is about 0.1–5.0% by weight.

3. A method according to claim 1 characterized in that the temperature is about 50°–100° C.

4. A method according to claim 1 characterized in that an antioxidant free from catalyst poison is present in the reaction mixture to prevent oxidation of organic substances.

5. A method according to claim 1 characterized in that a substituted phenol antioxidant is present in the reaction mixture, the substituent being taken from the class consisting of alkyl, aryl, aralkyl and cycloalkyl, and OH derivatives thereof, said substituent having 1–8 carbon atoms.

6. A method according to claim 5 characterized in that the amount of said antioxidant is about 0.1–3.0% by weight.

7. A method according to claim 5 characterized in that the catalyst is activated by heating at about 100°–150° C. for at least one hour.

8. A method according to claim 5 characterized in that a diluent is present in said mixture.

9. A method according to claim 5 characterized in that the ether has an alkyl radical of 1 to 4 carbon atoms.

10. A method according to claim 5 characterized in that the pressure is up to about 20 atmospheres.

11. A method according to claim 5 characterized in that the product is treated with a selective solvent for non-crystalline polymerized vinyl ether to dissolve the same, and recovering the crystalline polyvinyl ether.

12. A method according to claim 11 characterized in that said selective solvent is taken from the class consisting of water and methanol.

References Cited by the Examiner

UNITED STATES PATENTS

| 2,223,171 | 11/1940 | Gaylor | 260—91.1 |
| 2,985,617 | 5/1961 | Salyer et al. | 260—45.95 |
| 3,023,198 | 2/1962 | Nowlin | 260—91.1 |

FOREIGN PATENTS 845,073  9/1960  Great Britain.

OTHER REFERENCES

Schildknect: "Vinyl and Related Polymers," Wiley & Sons, New York, 1952, pp. 593–624. (Scientific Library, TP986V48S3.)

Muskina et al., Simpozium PO Makromal Khim: Moscow, 1960, Chem. Abstracts, vol. 55.

LEON J. BERCOVITZ, *Primary Examiner.*

J. R. LIBERMAN, *Examiner.*

H. W. HAEUSSLER, H. E. TAYLOR Jr.,
*Assistant Examiners.*